United States Patent [19]

Shiga et al.

[11] Patent Number: 5,026,889

[45] Date of Patent: Jun. 25, 1991

[54] CATALYST SYSTEM FOR OLEFIN POLYMERIZATION AND METHOD FOR PRODUCTION OF OLEFIN POLYMERS BY USING THE SAME

[75] Inventors: Akinobu Shiga; Yoshiharu Fukui; Toshio Sasaki, all of Niihama; Masahisa Okawa, Hirakata; Hideaki Matsuura, Hiihama, all of Japan

[73] Assignee: Sumitomo Chemical Company, Limited, Osaka, Japan

[21] Appl. No.: 287,491

[22] Filed: Dec. 21, 1988

Related U.S. Application Data

[63] Continuation-in-part of Ser. No. 39,729, Apr. 20, 1987, abandoned, which is a continuation-in-part of Ser. No. 601,716, Apr. 18, 1984, abandoned, which is a continuation of Ser. No. 160,479, Jun. 18, 1980, abandoned.

[30] Foreign Application Priority Data

| Jun. 20, 1979 [JP] | Japan | 54-78604 |
| Jan. 24, 1980 [JP] | Japan | 55-7545 |
| Jan. 24, 1980 [JP] | Japan | 55-7547 |
| May 10, 1980 [JP] | Japan | 55-62141 |

[51] Int. Cl.$^5$ .................... C08F 4/649; C08F 10/06
[52] U.S. Cl. .................... 526/142; 502/121; 502/122; 502/123; 502/125; 502/126; 502/127; 526/139; 526/140; 526/141; 526/351
[58] Field of Search ............. 526/139, 140, 141, 142

[56] References Cited

U.S. PATENT DOCUMENTS

| 3,026,311 | 3/1962 | Coover et al. ............. 526/140 |
| 3,113,115 | 12/1963 | Ziegler et al. . |
| 3,418,304 | 12/1968 | Langer et al. . |
| 3,502,634 | 3/1970 | Stedefeder et al. ......... 526/139 |
| 3,629,222 | 12/1971 | Coover ....................... 526/141 |
| 3,701,763 | 10/1972 | Wada et al. . |
| 3,779,944 | 12/1973 | Cozewith et al. . |
| 4,028,481 | 6/1977 | Shiomura et al. . |
| 4,094,818 | 6/1978 | Langer . |
| 4,096,092 | 6/1978 | Langer . |
| 4,107,413 | 8/1978 | Giannini et al. . |
| 4,107,416 | 8/1978 | Giannini et al. . |
| 4,136,243 | 1/1979 | Appleyard et al. ........... 526/139 |
| 4,192,772 | 3/1980 | Berger et al. . |
| 4,224,181 | 9/1980 | Langer ....................... 526/142 |
| 4,224,182 | 9/1980 | Langer et al. . |

FOREIGN PATENT DOCUMENTS

| 759544 | 5/1967 | Canada . |
| 1374568 | 8/1964 | France . |

(List continued on next page.)

OTHER PUBLICATIONS

Leegwater, "Effects of Molecular Weight Distribution on HDPE Container Molding", SPE Journal, vol. 25, pp. 47–52 (Nov. 1969).

*Primary Examiner*—Edward J. Smith
*Attorney, Agent, or Firm*—Birch, Stewart, Kolasch & Birch

[57] ABSTRACT

A catalyst system comprising
(A) a halogen compound of trivalent titanium,
(B) an organo-aluminum compound of the formula,

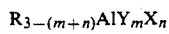

wherein Y is a group having at least one of oxygen, nitrogen, sulfur and phosphorus atoms linked to the aluminum atom, R is a hydrogen atom, an alkyl having 1 to 18 carbon atoms, an alkenyl having 2 to 18 carbon atoms, a cycloalkyl having 3 to 18 carbon atoms, an aryl having 6 to 18 carbon atoms, or an aralkyl having 7 to 18 carbon atoms,

X is a halogen atom, and m and n are numbers satisfying the equations, $0 < m < 1$, $0 \leq n < 2$, $0 < m + n \leq 2$, and (C) an electron-donor, and a method for producing an olefin polymer which comprises polymerizing olefins using said catalyst system. According to this method, highly crystalline olefin polymers having a broad molecular weight distribution can be produced.

1 Claim, 1 Drawing Sheet

FOREIGN PATENT DOCUMENTS

| | | |
|---|---|---|
| 46-3178 | 1/1971 | Japan . |
| 47-626 | 1/1972 | Japan . |
| 47-31431 | 8/1972 | Japan . |
| 57-102907 | 6/1982 | Japan . |
| 57-102908 | 6/1982 | Japan . |
| 59-172507 | 9/1984 | Japan . |
| 61-7305 | 1/1986 | Japan . |
| 61-9406 | 1/1986 | Japan . |
| 61-252205 | 11/1986 | Japan . |
| 62-124108 | 6/1987 | Japan . |
| 814626 | 6/1959 | United Kingdom . |
| 1078855 | 8/1967 | United Kingdom . |
| 1128090 | 9/1968 | United Kingdom . |
| 1128724 | 10/1968 | United Kingdom . |

CATALYST SYSTEM FOR OLEFIN POLYMERIZATION AND METHOD FOR PRODUCTION OF OLEFIN POLYMERS BY USING THE SAME

This application is a continuation-in-part of co-pending application Ser. No. 039,729, filed on Apr. 20, 1987, (now abandoned) which is a continuation-in-part of application Ser. No. 601,716, filed on Apr. 18, 1984 (now abandoned), which is, in turn, a continuation of application Ser. No. 160,479, filed on June 18, 1980 (now abandoned).

The present invention relates to a method for producing highly crystalline olefin polymers and a catalyst useful therefor. More particularly, it relates to a method for producing highly crystalline olefin polymers having a high stereoregularity and a broad molecular weight distribution superior in suitability for blow molding and extrusion molding using a novel catalyst system having a high polymerization activity.

As to catalysts for the polymerization of olefins, particularly propylene, it is well known that catalyst systems comprising a halogen compound of a transition metal belonging to Groups IVb to VIb of the periodic table (e.g. titanium trichloride) and a metal belonging to Groups I to III of the periodic table or its organo-compound (e.g. diethylaluminum chloride) are suitable as such catalysts.

In order to elevate the catalytic activity per transition metal many studies have been made on supported catalysts comprising transition metal compounds supported on various carriers. Particularly, it is known that a catalyst system comprising titanium tetrachloride supported on magnesium compounds as the carrier, a trialkylaluminum compound and an organic ester is desirable for propylene polymerization.

According to the polymerization process using this catalyst system, however, the produced olefin polymers, particularly propylene polymers, do not have a broad molecular weight distribution, and hence, they can not be molded at a high rate by extrusion molding or blow molding. As a result, the productive capacity of molding machines is lowered, and the resulting molded products have a rough surface and uneven thickness, so that their commercial value becomes substantially poor.

In the fields of extrusion molding and blow molding, therefore, it is very important and advantageous to develop a catalyst satisfying the following conditions at the same time in view of the commercial production of highly crystalline olefin polymers:

(1) It has a high catalytic activity.
(2) It can give a polymer having a high stereoregularity;
(3) It can give a polymer having a broad molecular weight distribution.

In the production of ethylene polymers, there have hitherto been proposed many catalyst systems which can produce polymers of a broad molecular weight distribution. However, there has never been found a catalyst system suitable for the production of polymers of an α-olefin having not less than 3 carbon atoms, which have a high stereoregularity and a broad molecular weight distribution.

From the foregoing standpoint, the present inventors have extensively studied an improved method for producing highly crystalline olefin polymers of a broad molecular weight distribution in an industrially advantageous manner. As a result, it has been found that a catalyst system comprising a combination of a halogen compound of trivalent titanium, a specific organo-aluminum compound and an electron-donor has a high activity and produces highly crystalline olefin polymers of a high stereoregularity and a broad molecular weight distribution, which are satisfactory from the industrial point of view.

Therefore, an object of the present invention is to provide a novel catalyst system suitable for the production of highly crystalline olefin polymers having a high stereoregularity and a broad molecular weight distribution. Another object of the invention is to provide a method for the production of highly crystalline olefin polymers as set forth above. These and other objects and advantages of the present invention will be apparent to persons skilled in the art from the following description.

The catalyst system of the present invention comprises
(A) a halogen compound of trivalent titanium,
(B) an organo-aluminum compound of the formula, $$R_{3-(m+n)}AlY_mX_n$$

wherein
Y is a group having at least one of oxygen, nitrogen, sulfur and phosphorus atoms linked to the aluminum atom, R is a hydrogen atom, an alkyl having 1 to 18 carbon atoms, an alkenyl having 1 to 18 carbon atoms, a cycloalkyl having 3 to 18 carbon atoms, an aryl having 6 to 18 carbon atoms or an aralkyl having 7 to 18 carbon atoms,
X is a halogen atom, and m and n are numbers satisfying the equations, $0<m<1$, $0\leq n<2$, $0<m+n\leq2$, and
(C) an electron-donor.

The catalyst system as set forth above is useful for the production of highly crystalline olefin polymers having a broad molecular weight distribution suitable for extrusion molding and blow molding as shown in the accompanying drawing, wherein.

It is well known to polymerize olefins using a catalyst system comprising titanium trichloride, an organo-aluminum alkoxide and organo-aluminum amide (cf. U.S. Pat. Nos. 3,418,304, 4,094,818 and 4,096,092). As shown in the Reference Examples described hereinafter, however, olefin polymers produced with this catalyst system are not only poor in stereoregularity but also do not show a broad molecular weight distribution. In other words, the coexistence of an electron-donor is essential to produce highly crystalline olefin polymers of a broad molecular weight distribution.

As the halogen compound of trivalent titanium (A) which is one of the components of the present catalyst system, there may be mentioned, for example, titanium trichloride, titanium tribromide, titanium triiodide, methoxytitanium dichloride, ethoxytitanium dichloride, n-butoxytitanium dichloride, dimethoxytitanium chloride, diethoxytitanium chloride and di-n-butoxytitanium chloride. Of these compounds, titanium trichloride is preferred.

Suitable titanium trichloride can preferably be produced by the following methods:

(1) Reduction of titanium tetrachloride with hydrogen (2) Reduction of titanium tetrachloride with metallic aluminum (3) Reduction of titanium tetrachloride with metallic titanium (4) Reduction of titanium tetrachloride with organo-aluminum compounds (5) Well-known activation treatments of titanium trichloride produced by the methods (1) to (4).

Examples of the well-known activation treatment are pulverization, heat treatment and treatments, as described in U.S. Pat. Nos. 4,165,298 and 4,123,387, British Patent No. 1,391,068 and French Patent No. 2,288,969. But the activation treatment in the present invention is not limited to these known methods.

From the standpoints of polymerization activity and stereoregularity, a particularly preferred titanium trichloride is the α-, γ- and δ-type ones having a violet color. Furthermore, titanium trichloride used herein need not have the composition of $TiCl_3$. For example, it may be in the form of an adduct with an inorganic or organic aluminum compound or an electron-donor such as ethers, or it may contain unreduced titanium tetrachloride or titanium dichloride produced by super-reduction.

The organo-aluminum compound (B) of the present catalyst system has the following formula:

$$R_{3-(m+n)}AlY_mX_n$$

wherein

Y is a group having at least one of oxygen, nitrogen, sulfur and phosphorus atoms linked to the aluminum atom, R is a hydrogen atom, an alkyl having 1 to 18 carbon atoms (e.g. methyl, ethyl, propyl, isopropyl, n-butyl, isobutyl, n-pentyl, isopentyl, tert-pentyl, hexyl, heptyl, octyl, 2-ethylhexyl, nonyl, decyl, dodecyl, etc.), an alkenyl having 2 to 18 carbon atoms (e.g. vinyl, allyl, etc.), a cycloalkyl having 3 to 18 carbon atoms (e.g. cyclopentyl, cyclohexyl, cycloheptyl, etc.), an aryl having 6 to 18 carbon atoms (e.g. phenyl, xylyl, tolyl, naphthyl, etc.), or an aralkyl having 7 to 18 carbon atoms (e.g. benzyl, phenethyl, etc.), X is a halogen atom (e.g. fluorine, chlorine, bromine, iodine), and m and n are numbers satisfying the equations, $0 < m < 1$, $0 \leq n < 2$ and $0 < m+n \leq 2$.

The organo-aluminum compounds include organo-aluminum alkoxides, organo-aluminum amides, organo-aluminum carboxylates, organo-aluminum siloxides, organo-aluminum thioalkoxides, organo-aluminum phosphides and organo-aluminoxanes.

Among these organo-aluminum compounds, suitable examples are the compounds of the above formula wherein Y is $OR^1$, $NR^2R^3$, $OCOR^4$, $OSiR^5R^6R^7$, $SR^8$ or $PR^9R^{10}$, in which $R^1$ to $R^{10}$ are the same or different and are each a hydrogen atom, an alkyl having 1 to 18 carbon atoms, a cycloalkyl having 3 to 18 carbon atoms, an aryl having 6 to 18 carbon atoms or an aralkyl having 7 to 18 carbon atoms. The alkyl, alkenyl, cycloalkyl, aryl and aralkyl for $R^1$ to $R^{10}$ include the same examples as set forth above for the R group. Particularly preferred compounds are the compounds of the above formula wherein Y is $OR^1$, $NR^2R^3$, $OCOR^4$ or $OSiR^5R^6R^7$, in which $R^1$ to $R^4$ are the same or different and are each an alkyl having 1 to 18 carbon atoms or an allyl group, and $R^5$ to $R^7$ are the same or different and are each a hydrogen atom, an alkyl having 1 to 18 carbon atoms or an allyl group.

From the standpoint of catalytic activity, m and n in the formula, $R_{3-(m+n)}AlY_mX_n$ are numbers satisfying the equations, $0 < m < 1$, $0 \leq n < 2$ and $0 < m+n \leq 2$, preferably $0.1 \leq m \leq 0.9$, $0 \leq n \leq 1.9$, and $0.1 \leq m+n \leq 2$, more preferably $0.2 \leq m \leq 0.7$, $0 \leq n \leq 1.8$ and $0.2 \leq m+n \leq 2$. When m is not less than 1 or n is not less than 2, the catalyst system shows lower catalytic activity The organo-aluminum alkoxide of the formula: $R_{3-(m+n)}Al(OR^1)_mX_n$ is easily obtained by reacting an organo-aluminum compound and an alcohol, phenol or oxygen by conventional methods. The organo-aluminum amide of the formula: $R_{3-(m+n)}Al(NR^2R^3)_mX_n$ is also obtained by reacting an organo-aluminum compound and an amine by conventional methods. The organo-aluminum carboxylate of the formula $R_{3-(m+n)}Al(OOCR^4)_mX_n$ is also obtained by reacting an organo-aluminum compound and a carboxylic acid or carbon dioxide by conventional methods. The organo-aluminum siloxide of the formula: $R_{3-(m+n)}Al(OSiR^5{}^6R^7)_mX_n$ is easily obtained by reacting an organo-aluminum compound and silanol, disiloxane or polysiloxane by conventional methods, too.

The organo-aluminum compound of the formula: $R_{3-(m+n)}AlY_mX_n$ used for polymerization in the present invention may be prepared previously in a flask or may be prepared in situ in a polymerization reactor.

The molar ratio of a titanium atom in the halogen compound of trivalent titanium to the organo-aluminum compound can be selected from the range of 10:1 to 1:500, but preferably it is within the range of 2:1 to 1:200.

The electron-donor used in the present invention includes oxygen-containing organic compounds having, for example, an ester linkage $\mathrm{+C-O+}$ , ether linkage $\mathrm{+C-O-C+}$, or carbonic ester linkage $\mathrm{+O-C-O+}$,
$$\phantom{xx}\overset{\|}{\mathrm{O}}$$

or a carbonyl, carboxyl, aldehyde or epoxy group; nitrogen-containing organic compounds, such as primary amines, secondary amines, tertiary amines, acid amides, acid imides, cyclic nitrogen compounds, nitrile compounds, ammonium group-containing compounds and saturated or unsaturated nitrogen compounds; phosphorus-containing organic compounds, such as phosphines, phosphites, phosphates and phosphoramides; and sulfur-containing organic compounds, such as thioethers, thioketones, thioaldehydes, sulfonic acids, sulfonates, sulfates and sulfites. Among these compounds, esters, phosphines, phosphites, phosphates, amines, amides, sulfites, ketones and aldehydes are particularly preferred.

Suitable examples of the electron-donor are ethyl acetate, phenyl acetate, ethyl valerate, methyl acrylate, methyl methacrylate, methyl benzoate, ethyl benzoate, methyl p-toluate, ethyl p-toluate, methyl anisate, ethyl anisate, acetone, acetylacetone, acetophenone, benzoyl chloride, acetyl chloride, triethylamine, butylamine, dibutylamine, tributylamine, pyridine, α-picoline, azobenzene, phenyl isocyanate, benzonitrile, tributyl phosphine, triphenyl phosphine, tributyl phosphite, triphenyl phosphite, tributyl phosphate, triphenyl phosphate, hexamethyl phosphoric triamide, carbon disulfide, butyl sulfite, dimethyl sulfone, mercaptans (e.g. methyl mercaptan, ethyl mercaptan), trilauryl trithiophosphate and the like.

In using the electron-donor for polymerization, it may previously be mixed with the foregoing organo-aluminum compound.

As shown in the Examples and Reference Examples hereinafter, the electron-donor is essential to elevate the stereoregularity of polymers and to broaden the molecular weight distribution of polymers. When the electron-donor is not used, the polymers obtained are not only poor in stereoregularity but also do not show broad molecular weight distribution. Accordingly, when the electron-donor is used in a small amount, the polymer obtained shows poor stereoregularity and a narrower molecular weight distribution. On the other hand, when the electron-donor is used in a too large amount, the catalyst system obtained shows lower catalytic activity. The effective amount of the donor is generally in the range of 0.005 to 5 moles, preferably 0.01 to 1 mole, based on 1 mole of the organo-aluminum compound.

Polymerization temperatures lower than 0° C. cause a lowering in polymerization rate, while those higher than 100° C. produce no polymers of a high stereoregularity. Consequently, it is a common practice to carry out the polymerization at a temperature ranging from 0° C. to 100° C.

The polymerization pressure is not particularly limited, but it is preferably about 3 to about 100 atmospheres from the industrial and economical points of view.

The polymerization may be carried out continuously or batchwise, and it may be carried out by any one of the slurry polymerization techniques using inert hydrocarbon solvents (e.g. propane, butane, pentane, hexane, heptane, octane), bulk polymerization techniques using a liquidified monomer (e.g. propylene, butene-1) as a polymerization medium and gas-phase polymerization techniques.

Olefins which can be applied to the present invention are those having from 2 to 10 carbon atoms. Suitable examples of the olefins are ethylene, propylene, butene-1, pentene-1, hexene-1, 3-methylpentene-1 and 4-methylpentene-1, which may be used alone or in combination of two or more thereof.

The polymerization of the present invention may be either homopolymerization or copolymerization. In copolymerization, copolymers can be obtained by bringing a mixture of two olefins or more into contact with the catalyst system of the present invention. Further, heteroblock copolymerization in which polymerization is carried out in two steps or more can easily be achieved.

According to the present invention, it is possible to obtain polymers of a high stereoregularity and a broad molecular weight distribution in a high yield from $\alpha$-olefins having particularly 3 carbon atoms or more, preferably propylene.

In the present invention, hydrogen may optionally be used as a molecular weight regulating agent.

The method of the present invention will be illustrated with reference to the following examples, which are not however to be interpreted as limiting the invention thereto. In the Examples and Reference Examples, MFI means melt flow index which was measured according to JIS K 6758.

Melt swelling ratio (hereinafter referred to as SR) is defined as a ratio of the diameter of the rod-like sample extruded for MFI measurement, which was measured at a portion 5 mm apart from the tip of the sample, to the diameter of the orifice of a melt flow index tester, as is shown by the following equation:

$$SR = \frac{\text{Diameter of extruded sample}}{\text{Diameter of orifice}}$$

$\overline{M}w/\overline{M}n$ is an index of molecular weight distribution, a ratio of weight average molecular weight $\overline{M}w$ to number average molecular weight $\overline{M}n$, which was measured according to the G.P.C. method (gel permeation chromatography). Larger values of $\overline{M}w/\overline{M}n$ mean that the molecular weight distribution is broader.

EXAMPLE 1

(A) Preparation of titanium trichloride catalyst

After the atmosphere in a 300-ml reactor was replaced with argon, dry heptane (40 ml) and titanium tetrachloride (10 ml) were added, and this solution was kept at $-5°$ C.

A mixture of dry heptane (80 ml) and ethylaluminum sesquichloride (23.2 ml) was added dropwise with stirring while keeping the temperature of the reaction system at $-3°$ C. or lower. The mixture was stirred for 2 hours at the same temperature, followed by heat treatment at 90° C. for 2 hours. After separation and washing, a titanium trichloride composition (16 g) was obtained.

The resulting composition (11.0 g) was slurried in toluene (55.0 ml), and iodine and di-n-butyl ether were added thereto so that the molar ratio of the composition, iodine and di-n-butyl ether was 1:0.1:1.0, followed by reaction at 95° C. for 1 hour. After the reaction was finished, the product was separated, washed and dried under reduced pressure to obtain a titanium trichloride catalyst (7.5 g).

(B) Preparation of aluminum alkoxide

After the atmosphere in a 200-ml flask was replaced with argon, dry heptane (75 ml), triethylaluminum (8.3 ml) and diethylaluminum chloride (7.6 ml) were added thereto.

Thereafter, a mixture of dry heptane (10 ml) and ethanol (2.1 ml) was added dropwise thereto at room temperature. After the addition was finished, the mixture was reacted at 70° C. for 30 minutes to obtain a halogenated alkylaluminum alkoxide of the composition: $Et_{2.2}Al(OEt)_{0.3}Cl_{0.5}$.

(c) Polymerization of propylene (I)

The atmosphere in a 5-liter stainless steel autoclave equipped with a stirrer was replaced with argon, and thereto were added dry heptane (1.5 liters), $Et_{2.2}Al(OEt)_{0.3}Cl_{0.5}$ (15.0 mmole) prepared in (B), ethyl p-anisate (2.25 mmole) and the titanium trichloride catalyst (120 mg) prepared in (A). Thereafter, hydrogen corresponding to a partial pressure of 0.16 kg/cm² was added.

After raising the temperature of the autoclave to 60° C., propylene was charged until the pressure, became 6 kg/cm², and then the polymerization reaction was initiated. The reaction was continued for 2 hours while supplying propylene so as to keep this pressure. After the polymerization was finished, the supply of the monomer was stopped, and the unreacted monomer was purged. Butanol (100 ml) was then added to decompose the catalyst.

The resulting polymer was filtered using a Buchner filter, washed with three 500-ml portions of heptane and dried at 60° C. to obtain 141 g of polypropylene. The filtrate was steam-distilled to remove heptane, and 7 g of an amorphous polymer was obtained.

The heptane-insoluble portion (hereinafter referred to as HIP) occupied 95.3% of the total yield of the polymers, and the boiling heptane-insoluble portion (hereinafter referred to as II) of HIP was 96.2%.

Also, Rp (g polypropylene/g TiCl$_3$.hr) expressed by the yield of polymer/g (TiCl$_3$ solid catalyst).hr was 617.

Figure 1:
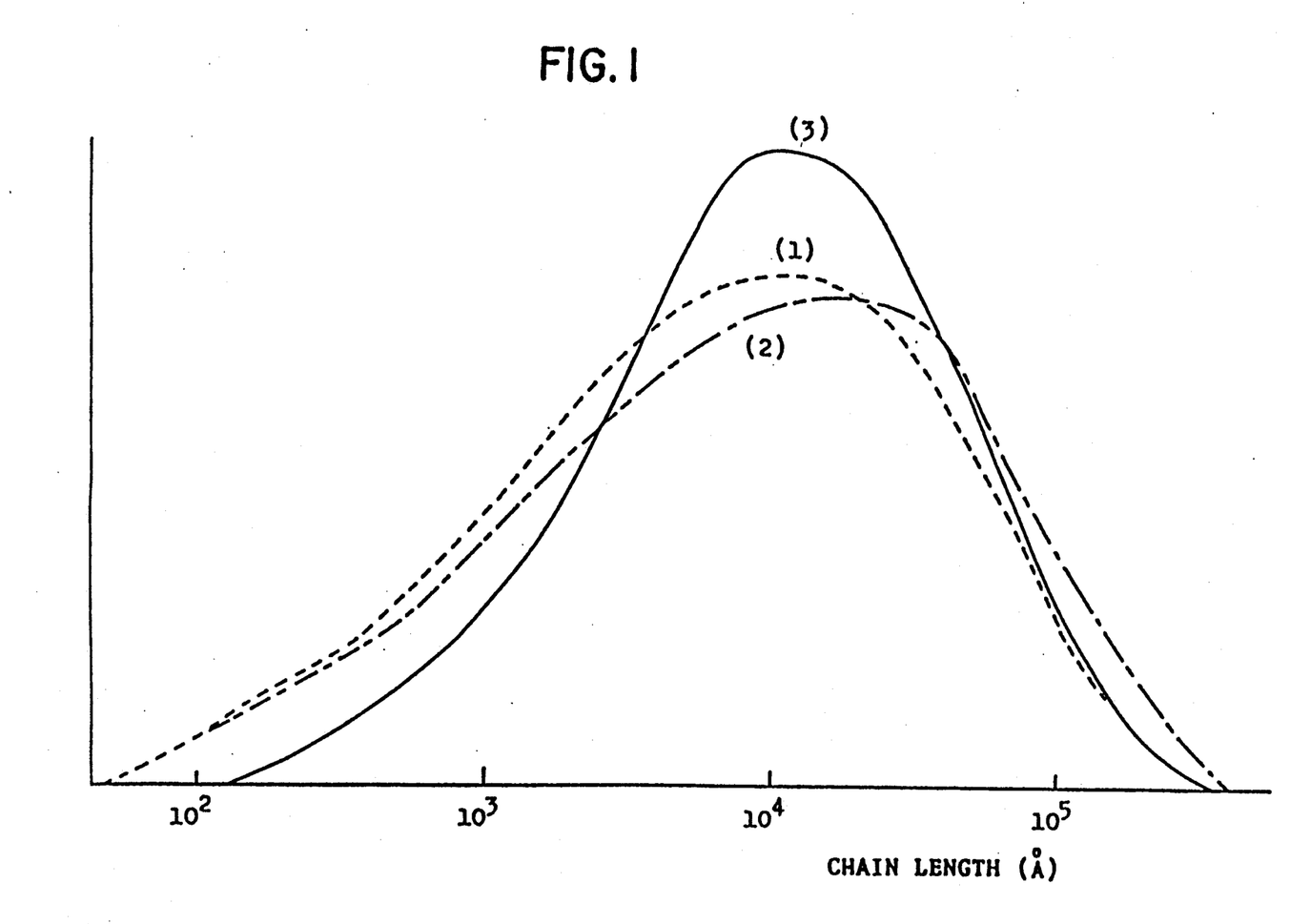
FIG. 1 shows corrected molecular weight distribution curves (G.P.C) of the polypropylene powders, (1) Example 1 (C), (2) Example 1 (D) and (3) Reference Example 3, as disclosed hereinafter.

The resulting polypropylene powder showed MFI=2.6; SR=1.55; and $\overline{M}w/\overline{M}n$=12.7, which means that the polypropylene had a broad molecular weight distribution. The corrected molecular weight distribution curve (G.P.C) of this product is shown in FIG. 1 (1).

(D) Polymerization of propylene (II)

After the atmosphere in a 5-liter stainless steel autoclave equipped with a stirrer was replaced with argon, Et$_{2.2}$Al(OEt)$_{0.3}$Cl$_{0.5}$ (15.0 mmole) prepared in (B), ethyl p-anisate (3.0 mmole) and the titanium trichloride catalyst (63 mg) prepared in (A) were added, and then hydrogen corresponding to a partial pressure of 0.66 kg/cm$^2$ was added.

Thereafter, liquid propylene (1.4 kg) was charged therein under pressure, and polymerization was continued for 2 hours while keeping the temperature of the autoclave at 60° C. After the polymerization was finished, the unreacted monomer was purged and methanol (100 ml) was added to decompose the catalyst The resulting polypropylene was filtered using a Buchner filter and dried at 60° C. under reduced pressure to obtain 196 g of polypropylene.

The polymerization activity was 1560 as expressed in Rp, and the boiling heptane-insoluble portion (II) was 95.1%. The resulting polypropylene powder showed MFI=0.83; SR=1.50; and $\overline{M}w/\overline{M}n$=15.0, which means that the polypropylene had a broad molecular weight distribution. FIG. 1 (2) shows a corrected molecular weight distribution curve (G.P.C.) of this product.

Reference Example 1

Propylene was polymerized in the same manner as in Example 1 (C) except that TiCl$_3$AA (145 mg, produced by Toho Titanium Co.) which is usually used in industry and diethylaluminum chloride (15.0 mmole) were used, but ethyl p-anisate was not used.

As a result, Rp=240, HIP=92.2% and II=96.3%. The resulting polypropylene powder showed MFI=1.5, SR=1.36 and $\overline{M}w/\overline{M}n$=6.5. Thus, the molecular weight distribution of this polypropylene was narrower as compared with that of the polymer obtained in Example 1.

Reference Example 2

Propylene was polymerized in the same manner as in Example 1 (D) except that TiCl$_3$AA (92 mg, produced by Toho Titanium Co.) and diethylaluminum chloride (15.0 mmole) were used, but ethyl p-anisate was not used.

As a result, Rp=494, and boiling heptane-insoluble portion (II)=92.4%. The resulting polypropylene powder showed MFI=2.2, SR=1.38 and $\overline{M}w/\overline{M}n$=6.7.

Reference Example 3

Propylene was polymerized in the same manner as in Example 1 (C) except that the amount of the titanium trichloride catalyst prepared in Example 1 (A) was changed to 104 mg and diethylaluminum chloride (15.0 mmole) was used in place of Et$_{2.2}$Al(OEt)$_{0.3}$Cl$_{0.5}$, but ethyl p-anisate was not used.

As a result, Rp=816, HIP=97.4% and II=98.6%. The resulting polypropylene powder showed MFI=1.7, SR=1.37 and $\overline{M}w/\overline{M}n$=6.5. Thus, the molecular weight distribution of this polypropylene was narrower as compared with that of the polymer obtained in Example 1. FIG. 1 (3) shows a corrected molecular weight distribution curve (G.P.C.) of this polypropylene.

Reference Example 4

Propylene was polymerized in the same manner as in Reference Example 3 except that 2.25 mmole of ethyl p-anisate was used. As a result, Rp=771, HIP=97.7% and II=98.9%. The resulting polypropylene powder showed MFI=1.0, SR=1.35 and $\overline{M}w/\overline{M}n$=6.6. It is found from the results that, as compared with Reference Example 3, the stereoregularity improves to some degree by using ethyl p-anisate, but that the molecular weight distribution changes only a little.

Reference Example 5

Propylene was polymerized in the same manner as in Example 1 (C) except that the amount of the titanium trichloride catalyst prepared in Example 1 (A) was changed to 133 mg, triethylaluminum (15.0 mmole) was used in place of Et$_{2.2}$Al(OEt)$_{0.3}$Cl$_{0.5}$, and the amount of ethyl p-anisate was changed to 3.75 mmole.

As a result, Rp=557, HIP=89.1% and II=94.9%. The resulting polypropylene powder showed MFI=2.3, SR=1.40 and $\overline{M}w/\overline{M}n$=7.4. Thus, the molecular weight distribution of this polypropylene was narrower as compared with that of the polymer obtained in Example 1.

Reference Example 6

Propylene was polymerized in the same manner as in Example 1 (C) except that ethyl p-anisate was not used.

As a result, Rp=2430, HIP=72.0%, II=83.8%, MFI=9.1, SR=1.46 and $\overline{M}w/\overline{M}n$=6.8. It is found from the results that, when ethyl p-anisate is not used, the stereoregularity is lowered extremely and the molecular weight distribution does not become broad as compared with the polymer in Example 1.

Reference Example 7

In the same manner as in Example 1 (B), halogenated alkylaluminum chloride of the composition, EtAl(OEt)Cl, was prepared by reacting diethylaluminum chloride with ethanol.

Propylene was then polymerized in the same manner as in Example 1 (C) except that the titanium trichloride catalyst (127 mg) prepared in Example 1 (A) and EtAl(OEt)Cl (15.0 mmole) were used, but ethyl p-anisate was not used.

As a result, Rp=602, HIP=97.0% and II=98.2%. The resulting polypropylene powder showed MFI=1.8, SR=1.35 and $\overline{M}w/\overline{M}n$=6.0. Thus the molecular weight distribution of this polypropylene was narrower as compared with that of the polymer in Example 1.

EXAMPLE 2

After the atmosphere in a 200-ml flask was replaced with argon, dry heptane (75 ml), triethylaluminum (11.0 ml) and ethylaluminum sesquichloride (4.6 ml) were added. Thereafter, a mixture of dry heptane (10 ml) and ethanol (2.1 ml) was added dropwise thereto at room temperature. After the addition was finished, the mixture was reacted at 70° C. for 30 minutes to obtain an organo-aluminum alkoxide of the same composition, $Et_{2.2}Al(OEt)_{0.3}Cl_{0.5}$, as in Example 1.

Propylene was then polymerized in the same manner as in Example 1 (C) except that 15.0 mmole of this organo-aluminum alkoxide was used. As a result, Rp=596, HIP=95.7% and II=96.3%. The resulting polypropylene powder showed MFI=2.9, SR=1.54 and $\overline{MW}/\overline{Mn}$=13.2.

Examples 3 to 13

According to the method for organo-aluminum alkoxide described in Example 1 (B), various organo-aluminum alkoxides were prepared by reacting organo-aluminum compounds with alcohols or phenols.

Propylene was then polymerized in the same manner as in Example 1 (C) except that the titanium trichloride catalyst (120 mg) prepared in Example 1 (A), the foregoing aluminum alkoxides (15 mmole) and ethyl p-anisate (2.25 mmole) were used.

The results are shown in Table 1. Good results were obtained in all cases.

As a result, Rp=276, HIP=92.5% and II=95.7%. The resulting polypropylene powder showed MFI=2.2, SR=1.51 and $\overline{Mw}/\overline{Mn}$=12.2. Thus, this polymer had a broad molecular weight distribution.

EXAMPLE 22

(A) Preparation of titanium trichloride by reduction with organo-aluminum compounds After the atmosphere in a 300-ml flask was replaced with argon, dry heptane (80 ml) and titanium tetrachloride (20 ml) were added, and this mixture was kept at −5° C. Thereafter, a mixture of dry heptane (60 ml) and diethylaluminum chloride (23.2 ml) was added dropwise to the reaction system while keeping the temperature of the system at −3° C.

After the addition was finished, the mixture was stirred for an additional 30 minutes, and after raising the temperature of the system to 70° C., stirring was continued for an additional 1 hour. After the reaction was finished, the reaction system was allowed to stand, and the resulting reduction product was separated from the liquid portion, washed with heptane (100 ml) and dried

TABLE 1

| Example No. | Alluminum alkoxide | Partial pressure of $H_2$ (kg/cm$^2$) | Rp (g pp/g solid · hr) | HIP (%) | II (%) | MFI | SR | Mw/Mn |
|---|---|---|---|---|---|---|---|---|
| Example 3 | $Et_{2.45}Al(OEt)_{0.3}Cl_{0.25}$ | 0.16 | 599 | 95.7 | 96.3 | 2.3 | 1.55 | 10.7 |
| Example 4 | $Et_{1.95}Al(OEt)_{0.3}Cl_{0.75}$ | 0.26 | 662 | 96.1 | 97.8 | 1.8 | 1.48 | 12.1 |
| Example 5 | $Et_{1.2}Al(OEt)_{0.3}Cl_{1.5}$ | 0.26 | 457 | 95.1 | 97.6 | 2.1 | 1.40 | 9.2 |
| Example 6 | $Et_{2.7}Al(OEt)_{0.3}$ | 0.16 | 352 | 95.4 | 95.9 | 1.8 | 1.50 | 11.0 |
| Example 7 | $Et_{1.9}Al(OEt)_{0.6}Cl_{0.5}$ | 0.26 | 276 | 94.7 | 95.5 | 2.7 | 1.56 | 12.7 |
| Example 8 | $Et_{2.2}Al(OEt)_{0.3}Br_{0.5}$ | 0.26 | 510 | 95.3 | 96.0 | 3.9 | 1.60 | 12.2 |
| Example 9 | $Et_{2.2}Al(OEt)_{0.3}I_{0.5}$ | 0.26 | 338 | 94.9 | 95.4 | 4.0 | 1.62 | 12.5 |
| Example 10 | $(i-Bu)_{2.2}Al(OEt)_{0.3}Cl_{0.5}$ | 0.16 | 574 | 95.5 | 96.1 | 2.2 | 1.52 | 12.5 |
| Example 11 | $H_{0.2}Et_{2.0}Al(OEt)_{0.3}Cl_{0.5}$ | 0.26 | 735 | 95.8 | 98.7 | 1.7 | 1.44 | 11.7 |
| Example 12 | $Et_{2.2}Al(OBu)_{0.3}Cl_{0.5}$ | 0.16 | 586 | 95.5 | 96.2 | 2.5 | 1.51 | 12.4 |
| Example 13 | $Et_{2.2}Al(O\phi)_{0.3}Cl_{0.5}$ | 0.11 | 620 | 94.9 | 96.1 | 3.2 | 1.55 | 11.6 |

Note:
(1) The polymerization was carried out under the same conditions as in Example 1 (C): $R_{3-(m+n)}^1Al(OR^2)_mX_n$, 15 mmole; ethyl p-anisate, 2.25 mmole; 60° C., 6 kg/cm$^2$, 2 hours
(2) Symbols. Et, Bu OEt, OBu and Oφ mean ethyl, butyl, ethoxide, butoxide and phenoxide groups, respectively.

EXAMPLES 14 TO 20

Propylene was polymerized in the same manner as in Example 1 (C) except that various electron-donors shown in Table 2 were used in place of ethyl p-anisate, and that $Et_{1.95}Al(OEt)_{0.3}Cl_{0.75}$ (15 mmole) was used as the halogenated alkylaluminum alkoxide. The results are shown in Table 2.

under reduced pressure to obtain 29.6 g of an organoaluminum-reduced titanium trichloride.

(B) Heat treatment of organoaluminum-reduced titanium trichloride

The organoaluminum-reduced titanium trichloride (10 g) prepared in (A) was slurried in n-decane so that its concentration was 0.2 g/cc, followed by heat treatment at 140° C. for 2 hours. After the reaction was

TABLE 2

| Example No. | Electron-donor (D) Kind | Amount (mmole) | Partial pressure of $H_2$ (kg/cm$^2$) | Rp (g pp/g solid · hr) | HIP (%) | II (%) | MFI | SR | Mw/Mn |
|---|---|---|---|---|---|---|---|---|---|
| Example 14 | Methyl p-toluate | 2.25 | 0.26 | 644 | 96.2 | 97.6 | 2.1 | 1.52 | 12.8 |
| Example 15 | Ethyl benzoate | 2.25 | 0.26 | 626 | 96.0 | 97.3 | 2.0 | 1.50 | 12.3 |
| Example 16 | Methyl methacrylate | 2.25 | 0.26 | 415 | 95.6 | 97.0 | 1.6 | 1.42 | 10.7 |
| Example 17 | ε-Caprolactone | 2.25 | 0.26 | 397 | 95.7 | 97.2 | 1.9 | 1.44 | 11.2 |
| Example 18 | Triphenyl phosphite | 1.1 | 0.11 | 550 | 91.5 | 94.6 | 2.8 | 1.55 | 12.5 |
| Example 19 | Hexamethyl phosphoric triamide | 1.1 | 0.11 | 472 | 91.9 | 94.9 | 2.4 | 1.47 | 11.5 |
| Example 20 | Butyl sulfite | 1.1 | 0.11 | 605 | 92.3 | 95.1 | 3.3 | 1.51 | 10.8 |

Note: (1) The polymerization was carried out under the same conditions as in Example 1 (C): $Et_{1.95}Al(OEt)_{0.3}Cl_{0.75}$, 15 mmole; 60° C., 6 kg/cm$^2$, 2 hours

EXAMPLE 21

Propylene was polymerized in the same manner as in Example 1 (C) except that $TiCl_3AA$ (170 mg, produced by Toho Titanium Co.) was used as titanium trichloride catalyst.

finished, the supernatant liquor was removed, and the solid product was washed with two 50-ml portions of heptane to obtain heat-treated titanium trichloride.

(C) Polymerization of propylene

Propylene was polymerized in the same manner as in Example 1 (C) except that the heat-treated titanium trichloride prepared in (B) was used. As a result, Rp=293, HIP=92.3% and II=95.6%. The resulting polypropylene powder showed MFI=1.9, SR=1.48 and $\overline{M}w/\overline{M}n=12.0$.

EXAMPLE 23

(A) Preparation of titanium trichloride catalyst

The organoaluminum-reduced titanium trichloride (10.6 g) prepared in Example 22 (A) was suspended in dry heptane (50 ml), and diisoamyl ether of 1.2 times by mole based on said titanium trichloride was added thereto, followed by stirring at 40° C. for 1 hour. After the reaction was finished, the supernatant liquor was removed, and the solid product was washed with three 50-ml portions of heptane and dried to obtain an ether-treated titanium trichloride.

Thereafter, the ether-treated titanium trichloride (5 g) was added to a mixture of heptane (15 ml) and titanium tetrachloride (10 ml), and the mixture was reacted at 70° C. for 2 hours. After the reaction was finished, the supernatant liquor was removed, and the solid product was washed with three 50-ml portions of heptane and dried to obtain a titanium trichloride catalyst.

(B) Polymerization of propylene

Propylene was polymerized in the same manner as in Example 1 (C) except that the titanium trichloride catalyst prepared in (A) was used. As a result, Rp=675, HIP=95.5% and II=96.1%. The resulting polypropylene powder showed MFI=2.0, SR=1.49 and $\overline{M}w/\overline{M}n=12.4$. Thus, the polymer had a broad molecular weight distribution.

EXAMPLE 24

(A) Preparation of titanium trichloride catalyst

After the atmosphere in a 300-ml flask was replaced with argon, dry toluene (80 ml), diethylaluminum chloride (8.6 ml) and di-n-butyl ether (23 ml) were added, and this mixture was kept at 10° C. Thereafter, a mixture of dry toluene (20 ml) and titanium tetrachloride (15 ml) was added dropwise to the reaction system while keeping the temperature of the system at 10° C.

After the addition was finished, the mixture was stirred ar room temperature for 1 hour, at 50° C. for 30 minutes and then at 100° C. for 1 hour to carry out heat precipitation treatment. After the reaction was finished, the supernatant liquor was removed, and the solid product was washed with two 100-ml portions of toluene and then two 100-ml portions of heptane, and dried under reduced pressure to obtain 19.4 g of a titanium trichloride catalyst.

(B) Polymerization of propylene

Propylene was polymerized in the same manner as in Example 1 (C) except that the titanium trichloride catalyst prepared in (A) was used. As a result, Rp=641, HIP=95.7% and II=96.0%. The resulting polypropylene powder showed MFI=3.0, SR=1.52 and $\overline{M}w/\overline{M}n=12.8$. Thus, the polymer had a broad molecular weight distribution.

EXAMPLE 25

Copolymerization of ethylene and propylene was carried out by using the titanium trichloride catalyst obtained in Example 1 (A). The reaction was carried out in the same manner as in Example 1 (C) except that an ethylene/propylene mixed gas containing 2.5 vol % of ethylene was used in place of propylene.

As a result, the polymerization activity was 641 as expressed in Rp, and HIP was 95.0%. The resulting copolymer showed MFI=3.2, SR=1.51, and $\overline{M}w/\overline{M}n=11.5$, which means that the copolymer had a broad molecular weight distribution. The ethylene content of the copolymer was 1.9% by weight according to analysis using infrared absorption spectrum.

Example 26

(A) Preparation of organo-aluminum amide

After the atmosphere in a 200-ml flask was replaced with argon, dry heptane (30 ml) and diethylaluminum hydride (3.0 g) were added, and diethylamine (2.6 g) was gradually added dropwise at room temperature with stirring. After the addition was finished, the reaction system was heated to 50° C. and stirred for 30 minutes at this temperature. Thereafter, a solution comprising diethylaluminum chloride (12.6 g) and heptane (100 ml) was added, and the system was stirred at 50° C. for 30 minutes to obtain an organo-aluminum amide of the composition, $Et_{2.0}Al(NEt_2)_{0.25}Cl_{0.75}$.

(B) Polymerization of propylene

Using the titanium trichloride catalyst (120 mg) prepared in Example 1 (A), propylene was polymerized in the same manner as in Example 1 (C) except that $Et_{2.0}Al(NEt_2)_{0.25}Cl_{0.75}$ (15.0 mmole) and ethyl p-anisate (2.25 mmole) were used. As a result, Rp=615, HIP=97.7% and II=98.1%. The resulting polypropylene powder showed MFI=2.2 ; SR=1.49 ; and $\overline{M}w/\overline{M}n=14.4$, which means that the polypropylene had a broad molecular weight distribution.

Reference Example 8

Propylene was polymerized in the same manner as in Example 26 except that ethyl p-anisate was not used. As a result, Rp=2640, HIP=74.1%, II=84.5%, MFI=9.4, SR=1.42 and $\overline{M}w/\overline{M}n=6.4$. It is found from the results that, when ethyl p-anisate is not used, the stereoregularity is extremely lowered and the molecular weight distribution does not become broad as compared with the polymer in Example 26.

EXAMPLES 27 TO 32

Propylene was polymerized in the same manner as in Example 1 (C) except that $Et_{2.0}Al(NEt_2)_{0.25}Cl_{0.75}$ (15 mmole) prepared in Example 26 was used, and various electron-donors shown in Table 3 were used in place of ethyl. p-anisate. The results are shown in Table 3.

TABLE 3

| Example No. | Electron-donor (D) Kind | Amount (mmole) | Rp (g pp/g solid · hr) | HIP (%) | II (%) | MFI | SR | Mw/Mn |
|---|---|---|---|---|---|---|---|---|
| Example 27 | n-Butyl sulfite | 2.25 | 602 | 95.6 | 98.0 | 17.4 | 1.85 | 15.1 |
| Example 28 | Triethylamine | 2.25 | 891 | 96.0 | 97.7 | 15.5 | 1.80 | 14.6 |
| Example 29 | Tri-n-butyl phosphine | 2.25 | 800 | 97.3 | 98.1 | 5.2 | 1.51 | 14.1 |
| Example 30 | Tri-n-butyl phosphite | 2.25 | 970 | 96.5 | 98.0 | 5.0 | 1.60 | 13.5 |
| Example 31 | Hexamethyl phosphoric triamide | 2.25 | 745 | 96.6 | 97.9 | 4.6 | 1.62 | 14.2 |

TABLE 3-continued

| Example No. | Electron-donor (D) Kind | Amount (mmole) | Rp (g pp/g solid · hr) | HIP (%) | II (%) | MFI | SR | Mw/Mn |
|---|---|---|---|---|---|---|---|---|
| Example 32 | Acetophenone | 1.50 | 526 | 97.1 | 98.2 | 2.1 | 1.55 | 14.4 |

Note: (1) The polymerization was carried out under the same conditions as in Example 1 (C): $Et_{2.0}Al(NEt_2)_{0.25}Cl_{0.75}$, 15 mmole; 60° C., 6 kg/cm², 2 hours

EXAMPLES 33 TO 42

According to the method for organo-aluminum amide described in Example 26, organo-aluminum amides of different compositions were prepared by reacting organo-aluminum compounds with amines.

Diethylaluminum thioethoxide and diethylaluminum diphenylphosphide were prepared by reacting triethylaluminum with sulfur and diphenyl phosphine, respectively, and then mixed with diethylaluminum chloride to obtain organo-aluminum thioalkoxide and organo-aluminum phosphide, respectively, of the compositions shown in Table 4.

Using the titanium trichloride catalyst (about 120 mg) prepared in Example 1 (A), propylene was polymerized in the same manner as in Example 1 (C) except that the foregoing organo-aluminum compounds of different compositions (15 mmole) were used as a promotor, and ethyl p-anisate (2.25 mmole) was used as an electron-donor. The results are shown in Table 4. Good results were obtained in all cases.

prepared in Example 23 was used. As a result, Rp=640, HIP=97.5% and II=98.2%. The resulting polypropylene powder showed MFI=2.0, SR=1.49 and $\overline{Mw}/\overline{Mn}=14.5$. Thus, the polymer had a broad molecular weight distribution.

EXAMPLE 46

Propylene was polymerized in the same manner as in Example 26 except that the titanium trichloride catalyst prepared in Example 24 was used. As a result, Rp=622, HIP=97.6% and II=98.1%. The resulting polypropylene powder showed MFI=3.1, SR=1.52 and $\overline{Mw}/\overline{Mn}=14.0$. Thus, the polymer had a broad molecular weight distribution.

EXAMPLE 47

Copolymerization of ethylene and propylene was carried out using the titanium trichloride catalyst (110 mg) obtained in Example 1 (A). The polymerization was carried out in the same manner as in Example 26 except that an ethylene/propylene mixed gas containing

TABLE 4

| Example No. | Organo-aluminum compound | Partial pressure of $H_2$ (kg/cm²) | Rp (g pp/g solid · hr) | HIP (%) | MFI | SR | Mw/Mn |
|---|---|---|---|---|---|---|---|
| Example 33 | $Et_{2.7}Al(NEt_2)_{0.3}$ | 0.16 | 364 | 95.6 | 2.5 | 1.49 | 11.4 |
| Example 34 | $Et_{2.5}Al(NEt_2)_{0.25}Cl_{0.25}$ | 0.16 | 581 | 96.0 | 2.7 | 1.50 | 11.7 |
| Example 35 | $Et_{1.2}Al(NEt_2)_{0.3}Cl_{1.5}$ | 0.26 | 410 | 95.4 | 2.4 | 1.45 | 10.7 |
| Example 36 | $Et_{1.9}Al(NEt_2)_{0.6}Cl_{0.5}$ | 0.26 | 295 | 95.5 | 3.3 | 1.56 | 13.6 |
| Example 37 | $(i-Bu)_{2.0}Al(NEt_2)_{0.25}Cl_{0.75}$ | 0.26 | 601 | 96.2 | 2.2 | 1.50 | 14.1 |
| Example 38 | $Et_{2.0}Al(NEt_2)_{0.25}I_{0.75}$ | 0.26 | 347 | 95.3 | 4.5 | 1.61 | 15.2 |
| Example 39 | $Et_{2.0}Al[N(i-Pr)_2]_{0.25}Cl_{0.75}$ | 0.26 | 649 | 97.5 | 2.3 | 1.50 | 13.9 |
| Example 40 | $Et_{2.0}Al(NPh_2)_{0.25}Cl_{0.75}$ | 0.26 | 622 | 97.2 | 2.2 | 1.48 | 12.8 |
| Example 41 | $Et_{2.0}Al(SEt)_{0.25}Cl_{0.75}$ | 0.26 | 554 | 94.5 | 3.1 | 1.55 | 12.0 |
| Example 42 | $Et_{2.0}Al(PPh_2)_{0.25}Cl_{0.75}$ | 0.26 | 518 | 90.1 | 1.9 | 1.46 | 12.7 |

Note:
(1) The polymerization was carried out under the same conditions as in Example 1 (C): Organo-aluminum compound, 15 mmole; ethyl p-anisate, 2.25 mmole; 60° C., 6 kg/cm², 2 hours
(2) Symbols, Et, i-Pr, i-Bu and Ph mean ethyl, isopropyl, isobutyl and phenyl groups, respectively.

EXAMPLE 43

Propylene was polymerized in the same manner as in Example 26 except that $TiCl_3AA$ (170 mg, produced by Toho Titanium Co.) was used as titanium trichloride catalyst. As a result, Rp=304, HIP=93.5% and II=96.2%. The resulting polypropylene powder showed MFI=2.1, SR=1.50 and $\overline{Mw}/\overline{Mn}=14.1$. Thus, the polymer had a broad molecular weight distribution.

EXAMPLE 44

Propylene was polymerized in the same manner as in Example 26 except that the heat-treated titanium trichloride prepared in Example 22 was used. As a result, Rp=311, HIP=93.3% and II=96.5%. The resulting polypropylene powder showed MFI=1.9, SR=1.48 and $\overline{Mw}/\overline{Mn}=13.6$.

EXAMPLE 45

Propylene was polymerized in the same manner as in Example 26 except that the titanium trichloride catalyst 2.5 vol % of ethylene was used in place of propylene. As a result, the polymerization activity was 709 as expressed in Rp, and HIP was 96.0%. The resulting copolymer showed MFI=3.4, SR=1.52, and $\overline{Mw}/\overline{Mn}=11.4$, which means that the copolymer had a broad molecular weight distribution. The ethylene content of the copolymer was 1.8% by weight according to analysis using infrared absorption spectrum.

EXAMPLE 48

(A) Preparation of organo-aluminum siloxide

After the atmosphere in a 200-ml flask was replaced with argon, dry heptane (30 ml) and diethylaluminum hydride (3.0 g) were added, and then methyl hydropolysiloxane (2.1 g, viscosity at 25° C.: about 30 centistokes) was added dropwise with stirring. During that period, the reaction temperature was kept at 20° C. by cooling the flask with ice water to prevent a rise in the temperature due to exothermic heat. After the addition was finished, the reaction system was heated to 55° C. and stirred for 1 hour at this temperature.

Thereafter, a mixture of diethylaluminum chloride (9.8 g) and heptane (100 ml) was added to the reaction system which was then stirred at 55° C. for an additional 30 minutes to obtain an organo-aluminum siloxide of the composition: $Et_{2.0}Al[OSiH_2(CH_3)]_{0.3}Cl_{0.7}$.

(B) Polymerization of propylene

Using the titanium trichloride catalyst (120 mg) prepared in Example 1 (A), propylene was polymerized in the same manner as in Example 1 (C) except that $Et_{2.0}Al[OSiH_2(CH_3)]_{0.3}Cl_{0.7}$ (15.0 mmole) and ethyl p-anisate (2.25 mmole) were used. As a result, Rp=629, HIP=96.7% and II=98.0%. The resulting polypropylene powder showed MFI=1.7, SR=1.45, and $\overline{Mw}/\overline{Mn}=12.2$, which means that the polypropylene had a broad molecular weight distribution.

Reference Example 9

Propylene was polymerized in the same manner as in Example 49 except that ethyl p-anisate was not used. As a result, Rp=1480, HIP=74.8% and II=85.1%, MFI=9.7, SR=1.43 and $\overline{Mw}/\overline{Mn}=6.8$. It is found from the results that, when ethyl p-anisate is not used, the stereoregularity is extremely lowered and the molecular weight distribution does not become broad as compared with the polymer in Example 48.

EXAMPLE 49 to 55

Propylene was polymerized in the same manner as in Example 1 (C) except that $Et_{2.0}Al[OSiH_2(CH_3)]_{0.3}Cl_{0.7}$ (15.0 mmole) prepared in Example 48 was used, and various electron-donors shown in Table 5 were used in place of ethyl p-anisate. The results are shown in Table 5.

EXAMPLES 56 TO 64

According to the method for organo-aluminum siloxide described in Example 48, organo-aluminum siloxides of different compositions were prepared by reacting organo-aluminum compounds with polysiloxane and silanol.

Using the titanium trichloride catalyst (about 120 mg) prepared in Example 1 (A), propylene was polymerized in the same manner as in Example 1 (C) except that aluminum siloxides (15 mmole) of different compositions were used as a promotor, and ethyl p-anisate (2.25 mmole) was used as an electron-donor. The results are shown in Table 6. Good results were obtained in all cases.

TABLE 6

| Example No. | Aluminum siloxide | Partial pressure of $H_2$ (kg/cm$^2$) | Rp (g pp/g solid · hr) | HIP (%) | II (%) | MFI | SR | Mw/Mn |
|---|---|---|---|---|---|---|---|---|
| Example 56 | $Et_{2.7}Al[OSiH_2(CH_3)]_{0.3}$ | 0.16 | 336 | 95.9 | 95.9 | 2.1 | 1.40 | 10.9 |
| Example 57 | $Et_{2.45}Al[OSiH_2(CH_3)]_{0.3}Cl_{0.25}$ | 0.16 | 572 | 96.2 | 96.3 | 2.4 | 1.54 | 10.8 |
| Example 58 | $Et_{1.2}Al[OSiH_2(CH_3)]_{0.3}Cl_{1.5}$ | 0.26 | 436 | 95.6 | 97.5 | 2.3 | 1.55 | 9.5 |
| Example 59 | $Et_{1.9}Al[OSiH_2(CH_3)]_{0.6}Cl_{0.5}$ | 0.26 | 264 | 95.2 | 95.7 | 3.0 | 1.58 | 12.2 |
| Example 60 | $Et_{2.0}Al[OSiH_2(CH_3)]_{0.3}Br_{0.7}$ | 0.26 | 465 | 95.8 | 96.2 | 4.1 | 1.60 | 12.6 |
| Example 61 | $Et_{2.0}Al[OSiH_2(CH_3)]_{0.3}I_{0.7}$ | 0.26 | 323 | 95.4 | 95.9 | 4.2 | 1.62 | 15.1 |
| Example 62 | $(i-Bu)_{2.0}Al[OSiH_2(CH_3)]_{0.3}Cl_{0.7}$ | 0.26 | 548 | 96.0 | 97.9 | 2.0 | 1.41 | 12.7 |
| Example 63 | $Et_{2.0}Al(OSiEt_3)_{0.3}Cl_{0.7}$ | 0.26 | 617 | 95.6 | 97.5 | 1.9 | 1.45 | 11.8 |
| Example 64 | $Et_{2.0}Al(OSiPh_3)_{0.3}Cl_{0.7}$ | 0.26 | 591 | 95.4 | 97.0 | 3.3 | 1.55 | 12.4 |

Note:
(1) The polymerization was carried out under the same conditions as in Example 1 (C): Aluminum siloxide, 15 mmole; ethyl p-anisate, 2.25 mmole; 60° C., 6 kg/cm$^2$, 2 hours
(2) Symbols, Et, i-Bu and Ph mean ethyl, isobutyl and phenyl groups, respectively.

EXAMPLE 65

Propylene was polymerized in the same manner as in Example 48 except that TiCl$_3$AA (150 mg, produced by Toho Titanium Co.) was used as titanium trichloride catalyst. As a result, Rp=285, HIP=93.1% and II=96.4%. The resulting polypropylene powder showed MFI=2.4, SR=1.51 and $\overline{Mw}/\overline{Mn}=12.0$. It is found from the results that the polymer had a broad molecular weight distribution.

EXAMPLE 66

Propylene was polymerized in the same manner as in Example 48 except that the heat-treated titanium trichloride prepared in Example 22 was used. As a result, Rp=309, HIP=93.0% and II=96.4%. The resulting polypropylene powder showed MFI=2.0, SR=1.46 and $\overline{Mw}/\overline{Mn}=12.5$.

EXAMPLE 67

Propylene was polymerized in the same manner as in Example 48 except that the titanium trichloride catalyst prepared in Example 23 was used. As a result, Rp=702, HIP=96.5% and II=98.1%. The resulting polypropylene powder showed MFI=2.1, SR=1.50 and $\overline{Mw}/\overline{Mn}=12.4$. Thus, the polymer had a broad molecular weight distribution.

TABLE 5

| Example No. | Electron-donor (D) Kind | Amount (mmole) | RP (g pp/g solid · hr) | HIP (%) | II (%) | MFI | SR | Mw/Mn |
|---|---|---|---|---|---|---|---|---|
| Example 49 | Tri-n-butyl phosphine | 2.25 | 764 | 97.2 | 97.9 | 5.5 | 1.52 | 12.5 |
| Example 50 | Tri-n-butyl phosphite | 2.25 | 926 | 96.1 | 98.1 | 5.1 | 1.59 | 12.2 |
| Example 51 | Hexamethyl phosphoric triamide | 2.25 | 714 | 97.0 | 98.0 | 4.8 | 1.61 | 15.8 |
| Example 52 | n-butyl sulfite | 2.25 | 690 | 95.8 | 97.6 | 18.8 | 1.88 | 14.1 |
| Example 53 | Triethylamine | 2.25 | 851 | 96.2 | 98.0 | 15.0 | 1.79 | 15.6 |
| Example 54 | Acetophenone | 1.50 | 546 | 96.5 | 98.2 | 2.4 | 1.56 | 12.4 |
| Example 55 | Phenyl acetate | 1.30 | 370 | 96.0 | 98.1 | 3.5 | 1.55 | 11.3 |

Note: (1) The polymerization was carried out under the same conditions as in Example 1 (C): $Et_{2.0}Al[OSiH_2(CH_3)]_{0.3}Cl_{0.7}$, 15 mmole; 60° C., 6 kg/cm$^2$, 2 hours

EXAMPLE 68

Propylene was polymerized in the same manner as in Example 48 except that the titanium trichloride catalyst prepared in Example 24 was used. As a result, Rp=663, HIP=97.0% and II=98.0%. The resulting polypropylene powder showed MFI=2.4, SR=1.47 and $\overline{M}w/\overline{M}n$=12.5. Thus, the polymer had a broad molecular weight distribution.

EXAMPLE 69

Copolymerization of ethylene and propylene was carried out using the titanium trichloride catalyst (115 mg) obtained in Example 1 (A). The polymerization was carried out in the same manner as in Example 48 except that an ethylene/propylene mixed gas containing 2.2 vol % of ethylene was used in place of propylene.

As a result, the polymerization activity was 694 as expressed in Rp, and HIP was 95.8%. The resulting copolymer showed MFI=3.0, SR=1.50, and $\overline{M}w/\overline{M}n$=11.0, which means that the copolymer had a broad molecular weight distribution. The ethylene content of the copolymer was 1.7% by weight according to analysis using infrared absorption spectrum.

EXAMPLE 70

(A) Preparation of organo-aluminum carboxylate

After the atmosphere in a 200-ml flask was replaced with argon, dry heptane (30 ml) and diethylaluminum hydride (3.0 g) were added, and n-caproic acid (4.1 g) was added dropwise with stirring. During that period, the reaction temperature was kept at 0° C. to 10° C. by cooling the flask with ice water to prevent a rise in temperature due to exothermic heat. After the addition was finished, the reaction system was stirred at room temperature for an additional 1 hour. Thereafter, a mixture of diethylaluminum chloride (9.8 g) and heptane (100 ml) was added to the reaction system which was then stirred at 55° C. for 30 minutes to obtain an organo-aluminum carboxylate of the composition: $Et_{2.0}Al(OOCC_5H_{11})_{0.3}Cl_{0.7}$.

(B) Polymerization of propylene

Using the titanium trichloride catalyst (105 mg) prepared in Example 1 (A), propylene was polymeried in the same manner as in Example 1 (C) except that $Et_{2.0}Al(OOCC_5H_{11})_{0.3}Cl_{0.7}$ (15.0 mmole) and ethyl p-anisate (1.5 mmole) were used. As a result, Rp=760, HIP=96.5% and II=98.0%. The resulting polypropylene powder showed MFI=3.2, SR=1.56, and $\overline{M}w/\overline{M}n$=13.2, which means that the polypropylene had a broad molecular weight distribution.

Reference Example 10

Propylene was polymerized in the same manner as in Example 70 except that ethyl p-anisate was not used. As a result, Rp=1280, HIP=77.2%, II=85.1%, MFI=5.0, SR=1.45 and $\overline{M}w/\overline{M}n$=6.5. It is found that, when ethyl p-anisate is not used, the stereoregularity is extremely lowered and the molecular weight distribution does not become broad as compared with the polymer in Example 70.

EXAMPLES 71 TO 76

Propylene was polymerized in the same manner as in Example 1 (C) except that $Et_{2.0}Al(OOCC_5H_{11})_{0.3}Cl_{0.7}$ (15.0 mmole) prepared in Example 70 was used, and various electron-donors shown in Table 7 were used in place of ethyl p-anisate. The results are shown in Table 7.

TABLE 7

| Example No. | Electron-donor (D) Kind | Amount (mmole) | Rp (g pp/g solid · hr) | HIP (%) | II (%) | MFI | SR | Mw/Mn |
|---|---|---|---|---|---|---|---|---|
| Example 71 | n-Butyl sulfite | 1.5 | 711 | 95.0 | 97.5 | 15.8 | 1.80 | 15.0 |
| Example 72 | Acetophenone | 1.0 | 650 | 96.2 | 98.0 | 2.7 | 1.57 | 13.2 |
| Example 73 | Triethylamine | 1.5 | 924 | 95.7 | 97.6 | 14.5 | 1.77 | 15.6 |
| Example 74 | Tri-n-butyl phosphine | 1.5 | 856 | 96.4 | 97.9 | 6.0 | 1.52 | 14.3 |
| Example 75 | Tri-n-butyl phosphite | 1.5 | 981 | 96.1 | 97.6 | 5.5 | 1.60 | 13.5 |
| Example 76 | Hexamethyl phosphoric triamide | 1.5 | 805 | 95.7 | 97.4 | 5.1 | 1.64 | 14.8 |

Note: (1) The polymerization was carried out under the same conditions as in Example 1 (C): $Et_{2.0}Al(OOCC_5H_{11})_{0.3}Cl_{0.7}$, 15 mmole; 60° C., 6 kg/cm², 2 hours.

EXAMPLES 77 TO 84

According to the method for organo-aluminum carboxylate described in Example 70, organo-aluminum carboxylates of different compositions were prepared by reacting organo-aluminum compounds with carboxylic acids.

Using the titanium trichloride catalyst (about 120 mg) prepared in Example 1 (A), propylene was polymerized in the same manner as in Example 1 (C) except that the foregoing organo-aluminum carboxylates of different compositions (15 mmole) were used as a promotor, and ethyl p-anisate (1.5 mmole) was used as an electron-donor. The results are shown in Table 8. Good results were obtained in all cases.

TABLE 8

| Example No. | Organo-aluminum carboxylate | Partial pressure of $H_2$ (kg/cm²) | Rp (g pp/g solid · hr) | HIP (%) | MFI | SR | Mw/Mn |
|---|---|---|---|---|---|---|---|
| Example 77 | $Et_{2.7}Al(OOCC_5H_{11})_{0.3}$ | 0.16 | 440 | 94.9 | 2.6 | 1.51 | 10.7 |
| Example 78 | $Et_{1.2}Al(OOCC_5H_{11})_{0.3}Cl_{1.5}$ | 0.26 | 492 | 94.5 | 2.1 | 1.48 | 10.2 |
| Example 79 | $Et_{1.9}Al(OOCC_5H_{11})_{0.6}Cl_{0.5}$ | " | 363 | 95.1 | 3.7 | 1.55 | 13.1 |
| Example 80 | $(i\text{-}Bu)_{2.0}Al(OOCC_5H_{11})_{0.3}Cl_{0.7}$ | " | 721 | 96.2 | 3.0 | 1.52 | 12.5 |
| Example 81 | $Et_{2.0}Al(OOCC_5H_{11})_{0.3}I_{0.7}$ | " | 434 | 94.0 | 5.2 | 1.62 | 14.3 |
| Example 82 | $Et_{2.0}Al(OOCCH_3)_{0.3}Cl_{0.7}$ | " | 695 | 96.1 | 3.4 | 1.56 | 13.0 |
| Example 83 | $Et_{2.0}Al(OOCC_2H_5)_{0.3}Cl_{0.7}$ | " | 711 | 95.8 | 2.5 | 1.50 | 12.4 |

TABLE 8-continued

| Example No. | Organo-aluminum carboxylate | Partial pressure of $H_2$ (kg/cm$^2$) | Rp (g pp/g solid · hr) | HIP (%) | MFI | SR | Mw/Mn |
| --- | --- | --- | --- | --- | --- | --- | --- |
| Example 84 | $Et_{2.0}Al(OOCC_7H_{15})_{0.3}Cl_{0.7}$ | " | 606 | 96.0 | 2.9 | 1.52 | 11.6 |

Note:
(1) The polymerization was carried out under the same conditions as in Example 1 (C): Organo-aluminum carboxylate, 15 mmole; ethyl p-anisate, 1.5 mmole; 60° C., 6 kg/cm², 2 hours
(2) Symbols, Et and i-Bu, mean ethyl and isobutyl groups, respectively.

EXAMPLE 85

Propylene was polymerized in the same manner as in Example 70 except that TiCl$_3$AA (155 mg, produced by Toho Titanium Co.) was used as titanium trichloride catalyst As a result, Rp=334, HIP=92.6% and II=96.0%. The resulting polypropylene powder showed MFI=2.6, SR=1.51 and $\overline{Mw}/\overline{Mn}$=12.5. Thus, the polymer had a broad molecular weight distribution.

EXAMPLE 86

Propylene was polymerized in the same manner as in Example 70 except that the heat-treated titanium trichloride prepared in Example 22 was used. As a result, Rp=373, HIP=92.4% and II=95.6%. The resulting polypropylene powder showed MFI=2.3, SR=1.49 and $\overline{Mw}/\overline{Mn}$=12.1.

EXAMPLE 87

Propylene was polymerized in the same manner as in Example 70 except that the titanium trichloride catalyst prepared in Example 23 was used. As a result, Rp=750, HIP=96.6% and II=98.0%. The resulting polypropylene powder showed MFI=2.7, SR=1.51, and $\overline{Mw}/\overline{Mn}$=13.9, which means that the polymer had a broad molecular weight distribution.

EXAMPLE 88

Propylene was polymerized in the same manner as in Example 70 except that the titanium trichloride catalyst prepared in Example 24 was used. As a result, Rp=762, HIP=96.3% and II=97.8%. The resulting polypropylene powder showed MFI=3.0, SR=1.50 and $\overline{Mw}/\overline{Mn}$=14.1. Thus, the polymer had a broad molecular weight distribution.

EXAMPLE 89

Copolymerization of ethylene and propylene was carried out using the titanium trichloride catalyst (96 mg) obtained in Example 1 (A). Polymerization was carried out in the same manner as in Example 70 except that an ethylene/propylene mixed gas containing 2.3 vol % of ethylene was used in place of propylene.

As a result, the polymerization activity was 795 as expressed in Rp, and HIP was 95.4%. The resulting copolymer showed MRI=4.1, SR=1.56, and $\overline{Mw}/\overline{Mn}$=11.0, which means that the copolymer had a broad molecular weight distribution.

The ethylene content of the copolymer was 1.6% by weight according to analysis using infrared absorption spectrum.

We claim:

1. A method for producing a highly crystalline polypropylene having a broad molecular weight distribution which comprises:

polymerizing propylene at a temperature of from 0° to 100° C. in the presence of a catalyst system consisting essentially of:
(a) TiCl$_3$,
(b) an organoaluminum compound of the formula $(Et)_{3-(m+n)}Al(OBu)_mCl_n$ or
$(ET)_{3-(m+n)}Al(OEt)_mCl_n$ wherein Et is ethyl and Bu is butyl, and wherein m and n are numbers which satisfy the equations $0.2 \leq m \leq 0.7$, $0 \leq n \leq 1.8$ and $0.2 \leq m+n \leq 2$; and
(c) an electron-donor compound selected from the group consisting of ethyl benzoate and methyl p-toluate, wherein the molar ratio of electron-donor to organoaluminum compound is 0.01:1 to 1 to 1 and the molar ratio of organoaluminum compound to TiCl$_3$ is 0.5:1.0 to 200:1.

* * * * *